United States Patent
Chang et al.

(10) Patent No.: US 6,771,762 B1
(45) Date of Patent: Aug. 3, 2004

(54) SYSTEM AND METHOD FOR CALL MERGE TO AN AIN SSP FROM AN INTELLIGENT PERIPHERAL

(75) Inventors: Hwey Chang, Morganville, NJ (US); Pamela Lilly DeFazio, Ocean, NJ (US); Romel R. Khan, Eatontown, NJ (US); Maura Elizabeth Marcus, Middletown, NJ (US); Gary A. Munson, Little Silver, NJ (US); Gautham Natarajan, Marlboro Township, NJ (US)

(73) Assignee: AT&T Corp., New York, NY (US)

( * ) Notice: Subject to any disclaimer, the term of this patent is extended or adjusted under 35 U.S.C. 154(b) by 650 days.

(21) Appl. No.: 09/615,808

(22) Filed: Jul. 13, 2000

(51) Int. Cl.[7] ............................................... H04M 7/00
(52) U.S. Cl. .............................. 379/211.11; 379/221.08; 379/230
(58) Field of Search ...................... 379/115.02, 207.02, 379/221.08, 221.09, 221.11, 221.12, 229, 230

(56) References Cited

U.S. PATENT DOCUMENTS

| | | | |
|---|---|---|---|
| 5,208,848 A | * | 5/1993 | Pula ........................ 379/88.01 |
| 5,473,679 A | | 12/1995 | La Porta et al. ............. 379/201 |
| 5,535,263 A | | 7/1996 | Blumhardt .................... 379/67 |
| 5,644,631 A | | 7/1997 | Sattar et al. ................. 379/201 |
| 5,818,919 A | | 10/1998 | Berberich, Jr. et al. ..... 379/211 |
| 5,850,435 A | * | 12/1998 | Devillier ................. 379/374.02 |
| 5,864,614 A | * | 1/1999 | Farris et al. ........... 379/221.09 |
| 5,896,445 A | * | 4/1999 | Kay et al. .................... 379/135 |
| 6,028,924 A | | 2/2000 | Ram et al. ................... 379/229 |
| 6,373,930 B1 | * | 4/2002 | McConnell et al. ... 379/114.28 |
| 6,404,875 B2 | * | 6/2002 | Malik et al. ........... 379/211.03 |
| 6,512,818 B1 | * | 1/2003 | Donovan et al. ........ 379/88.18 |
| 6,674,851 B1 | * | 1/2004 | Brush et al. ........... 379/221.08 |

* cited by examiner

Primary Examiner—Bing Bui

(57) ABSTRACT

An AIN system having a service switching point (SSP), a service control point (SCP) and an intelligent peripheral (IPe) is disclosed. A calling party makes a call to a called party which results in a trigger signal at the originating SSP. The trigger signal causes the SSP to access the SCP which, in turn, sends a Send_to_Resource message to the SSP. In response to the Send_to_Resource message, the SSP establishes a first connection to an IPe, whose functionality is required. The IPe establishes a second connection carrying a second call to the called party, the first and second calls being connected at the IPe. The IPe subsequently requests that the SSP merge the first and second calls. In response, the call between the called party and the calling party is connected via the SSP, thereby releasing the IPe connections formerly used to connect calling and called parties.

23 Claims, 6 Drawing Sheets

100

300a

300b

358

SYSTEM AND METHOD FOR CALL MERGE TO AN AIN SSP FROM AN INTELLIGENT PERIPHERAL

RELATED APPLICATIONS

NONE

TECHNICAL FIELD

The present invention relates generally to Advanced Intelligent Networks (AIN). More particularly, the invention relates to a method for merging calls using the equipment associated with an AIN to free up resources.

BACKGROUND OF THE INVENTION

An AIN is a service-independent architectural concept for telecommunication networks. Its objectives include the easy development of new and innovative feature-rich services, reducing the turn-around time for the introduction or modification of these services, reducing developmental costs and to introduce more complex network functions by which users can communicate or manage information. U.S. Pat. No. 5,535,263, which is incorporated by reference to the extent necessary to understand the present invention, illustrates how an AIN can be used to enhance services.

One of the main distinguishing features of an AIN architecture with respect to a conventional switching network is that the intelligence or logic for executing value-added services is removed from the switch and is placed in one or more central computers called service control points (SCPs). AIN-capable switches, called service switching points (SSP), contain the functionality for communicating with the SCP. To make certain services more user-friendly, Intelligent Peripherals (IPe) may be provided, and these can be used to record prompts and announcements, provide voice recognition, voice-to-text functionality, and the like.

Value-added service calls can be originated from a local exchange (LE) or the SSP itself. In an AIN, the value-added service calls, or "trigger calls", are routed to the SSP which then opens a dialog with the SCP to guide the call to completion. The trigger call denotes the occurrence of a special condition which results in the telephone call being handled in a special way.

For certain types of toll calls and certain value-added services for which a subscriber is charged, an automatic message accounting (AMA) system is used to keep track of duration of the calls, accrued charges and other billing information. Typically, the AMA is resident in, or associated with, the SSP.

Typically, to provide special handling for a trigger call, the SSP suspends normal execution of the call, communicates with another network element to obtain special instructions, and handles the call according to the special instructions. Several types of triggers may be specified in an AIN-equipped switching system. They are classified as Originating Triggers, Mid-Call Triggers and Termination Triggers, depending on whether the special handling of the call is performed based on a triggering event at the time of initiation of a call, during the course of a call, or at the time of termination of a call. An example of an originating trigger is an 800-call trigger. This trigger is also called a Dialed Number trigger (DN trigger). Here, the special handling of the call is triggered by a user dialing the 800-number. In general, such numbers are translated to regular telephone numbers called Plain Old Telephone Service (POTS) numbers before they are routed to proper destination points via the traditional methods. Handling an 800-number call within an AIN network is described in detail in U.S. Pat. No. 5,425,090, which is incorporated herein by reference. Other examples of triggers are the Off-hook Immediate trigger (OHI), the Off-hook Delay trigger (OHD) and specific digits string trigger (SDS).

Communication between the different components of an AIN is performed through established protocols known to those skilled in the art. More particularly, communication within an AIN takes place between a host of switching systems, adjunct computer processors and other communicating components equipped with the capability to communicate using an out-of-band signaling method known as Common Channel Signaling (CCS). CCS is configured to carry network control information to and from various elements of the network. The AIN is described in detail in U.S. Pat. No. 5,247,571, which is incorporated herein by reference. For more information on intelligent telephony networks, see *The Intelligent Network Standards: Their Application to Services* (Igor Faynberg, Ed., McGraw Hill Series on Telecommunications, November, 1996). The details of the usage of CCS to control and manage a telecommunications network are given in U.S. Pat. Nos. 5,515,427 and 4,277,649, both of which are incorporated herein by reference. An example of the CCS signaling method is CCS No. 7 which also known as Signaling System 7, or SS7. SS7 is the name given to a suite of layered communication protocols that are used to access telephony databases, establish and maintain telephone calls and for other purposes. The part of the SS7 signaling protocol that is typically used by an AIN-equipped switching system to access telephony databases to obtain special instructions is called the Transaction Capabilities Application Part (TCAP).

FIG. 1 shows a simplified AIN system 100. System 100 includes a plurality of end users 102, such as a calling party or a called party, typically connected to an Service Switching Point (SSP) 104, 106, either directly or via one or more intermediary switches (IS) 108. The intermediary switch 108 may be operated by a local exchange carrier or may be a privately owned PBX switch, among others. The SSPs are usually connected to an end user with normal lines and trunks via protocols, such as Plain Old Telephone Service (POTS), Basic Rate Interface (BRI), and Primary Rate Interface (PRI). It should be understood that there may also be intermediary switches between an end user and the SSP, and that the SSP and the IS may belong to different carriers, which can be a local exchange carrier or an interexchange carrier.

When the SSP 104 or 106 encounters an AIN trigger for an incoming call, the SSP communicates with a Service Control Point (SCP) 110 to operate the requested service. The SSP and the SCP may communicate through the CSS7 network 112 which typically includes a number of Service Transfer Points (STPs). For voice-type functionality, one or more Intelligent Peripherals (IPe) 114 are connected to each of the SSPs 104, 106, which may also be connected to one another by one or more trunk lines 116. Each IPe 114 may include recording equipment for voice, fax and other media and is typically connected to a SSP using an ISDN trunk or line via PRI or BRI, or the like. It should also be noted that the IPe and the SSP may share the same platform, e.g., the same computer, but with different processes running on that computer. Communication between the SSP 104, 106 and the IPe 114 may be done with an AIN GR1129 IPe interface. As is known to those skilled in the art, an AIN GR1129 interface is an interworking between Transaction Capability Application Part (TCAP) protocol and Integrated Services Digital Network (ISDN) Q.931 protocol, where the SCP 110 communicates with the IPe 114 through the SSP using TCAP, and the IPe communicates with the SSP 104, 106 using Q.931. Each of the SSPs 104, 106 thus interworks TCAP and Q.931. Further information about the protocol for dealing with an IPe can be found in the GR-1129-CORE document; specifications for the AIN SSP switch procedures can be found in the GR-1298-CORE document; and information about the protocol between the SSP and the SCP can be found in the GR-1299-CORE document, all available from Telcordia (formerly Bellcore).

Normally, once the SCP helps connect the SSP and the IPe, the Ipe-resident applications are carried out without the IPe having to originate any calls. One option for using an IPe to originate a call, however, is to have the SCP send an AIN Analyze Route message to route the call to a service node, which then completes the connection to the called party. Once the connection to the called party is established, that service node can then merge the SSP-IPe connection with the connection to the called party by, for example, invoking the 2B channel call transfer specification in accordance with GR2865.

However, it is sometimes advantageous to use the AIN Send_To_Resource (STR) message, instead of the Analyze Route message, in such a manner that applications resident in the IPe originate the second call to establish a connection to the called party. This may be done, for example, to exploit capabilities inherent in AIN STR messaging schemes such as the capability to invoke new scripts in the IPe platform from the SCP without requiring SSP development, and the possibility of distributing data and control between the SCP and the IPe.

FIG. 2 presents a flow chart 300a and FIG. 3 present a call flow diagram 300b of the steps entailed in causing the IPe to originate a second call to connect the calling party to the called party. At step 302 a calling party dials a valid number and this is sent to the SSP. At step 304, the SSP encounters a valid AIN trigger, such as off-hook delay, a specific digit string trigger, or the like, and so sends a query to an SCP. At step 306, the SCP retrieves the customer account and recognizes that an IPe is needed for the call. At step 308, the SCP sends an AIN Send_to_Resource (STR) message to the SSP with the Destination Address parameter, which contains the network address of the IPe. This provides the SSP with access to the IPe.

At step 310, the SSP contacts the IPe and, at step 312, the IPe acknowledges the contact, thereby establishing a connection between the two. The connection between the SSP and the IPe is established using the typical GR1129 procedure, i.e., the SSP sends a Q.931 SETUP message to the IPe with a Facility Information Element (IE) containing the SendToIPResource invoke operation, and the IPe returns a Q.931 CALL PROCEEDING followed by a CONNECT message. This connection is called the B1 leg. At step 314, the IPe application processing originates the second call through the SSP to a called party. This connection is called the B2 leg. The B2 leg is internally bridged by the IPe to the B1 leg and so the calling party and the called party can potentially converse, exchange data, etc. During the call between the two parties, the B1 and B2 legs are maintained. During the call, the IPe and the SCP can potentially communicate, as per the service need, using AIN Call_Info_From_Resource and the Call_Info_To_Resource messages on the B1 side. The corresponding Q.931 message is a FACILITY message.

At the end of the call between the called party and the calling party, such as when the calling party hangs up, at step 316, the SSP sends a DISCONNECT message to the IPe, instructing the latter to tear down the call. It should be noted, however, that the reverse can happen, with the IPe sending the DISCONNECT message to the SSP. In either case, the DISCONNECT message results in the termination of the B1 and B2 legs, thereby releasing the two IPe ports used to sustain the call. At step 318, the SSP sends a Resource_Clear message to the SCP, advising the SCP that the SSP is done using the IPe for that call. The Resource_Clear message is sent to the SCP in the Response package if both the calling and the called parties have been torn down and no further instructions from the SCP are needed.

In the above example where the IPe originates the call to the called party, the call from the SSP to the IPe and the call from the IPe to the called party will be bridged for the entire duration of the call, even after the IPe's use is over. This wastes IPe ports which cannot be used to attend to other calls. This also means that the SCP transaction has to remain open for the entire duration of the call. This wastes SCP resources, since the SCP transaction is open from the time that an AIN STR message is sent, until an AIN Resource_Clear message is received by the SCP. It should also be noted that AIN makes no specific provision for causing true answer indication to propagate back towards the calling party when the called party on the B2 side actually answers, and for the time of answer and disconnect for the call to be captured in the AMA record for billing.

SUMMARY OF THE INVENTION

The present invention is directed to merging two connections made at the IPe in those cases where (a) a Send_to_Resource message, or equivalent, is sent by the SCP to the SSP for establishing a first leg with the IPe, and (b) the IPe subsequently originates the call to the called party using two or more IPe ports for the duration of the call. In the present invention, the first connection from the SSP to the IPe and the second connection from the IPe to the called party are merged in the SSP when the IPe is no longer needed for the service for that call. This results in the SSP directly connecting the called and calling parties from that point onward, even though the IPe initially connected the two. After the call has been merged at the SSP, the connections to the IPe are discontinued, thereby freeing the IPe to field other calls and respond to other tasks.

BRIEF DESCRIPTION OF THE DRAWINGS

The present invention can better be understood through the attached figures in which.

DETAILED DESCRIPTION OF THE INVENTION

As is known to those skilled in the art, an AIN Send_to_Resource (STR) message is a request message from an SCP to an SSP, to form a temporary bearer connection between the SSP and an IPe under the control of the SCP. Hence, the present invention contemplates freeing resources accessed pursuant to such a request message, regardless of its name.

Figure 1:
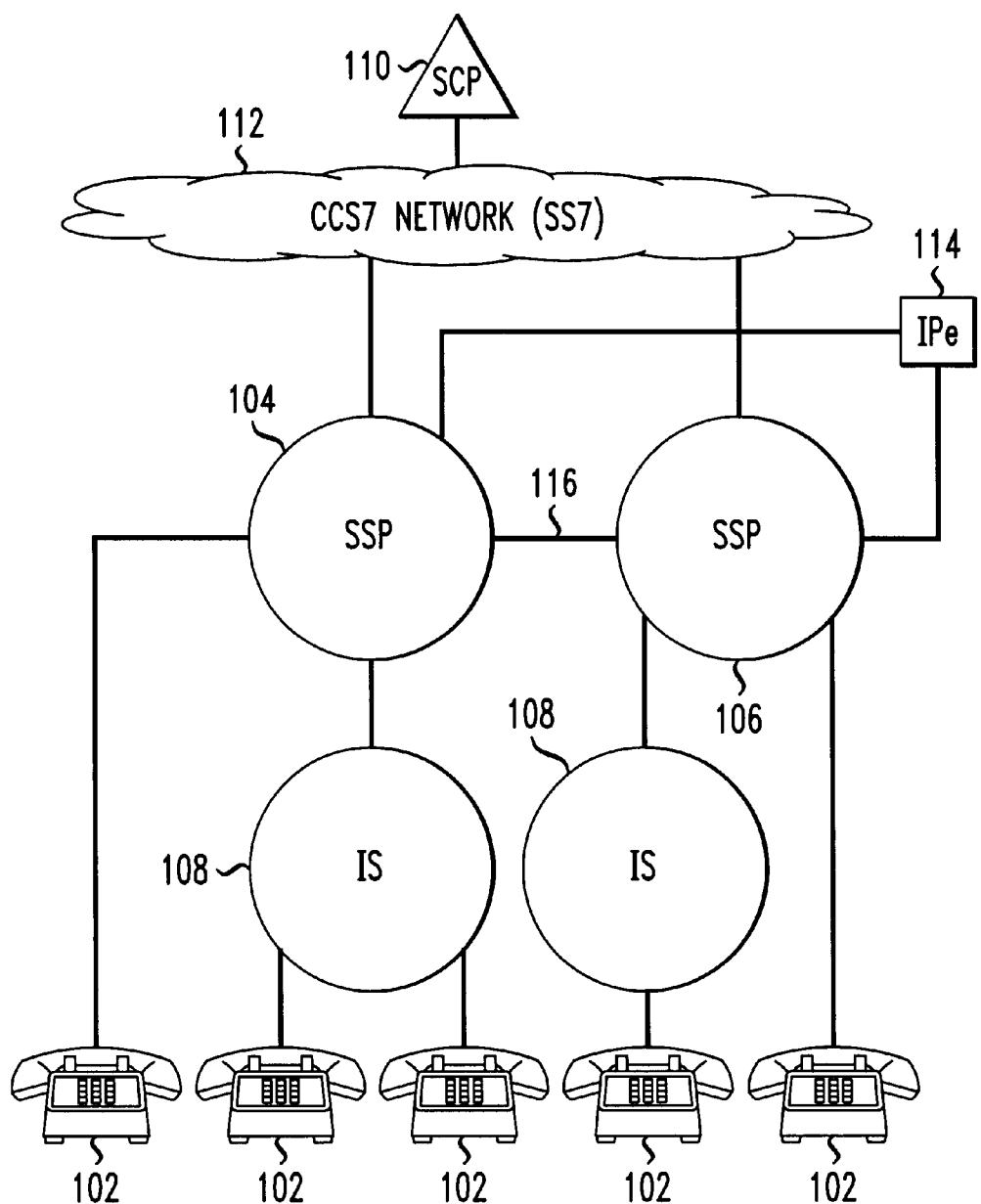
FIG. 1 shows an advanced intelligent network (AIN)
Figure 2:
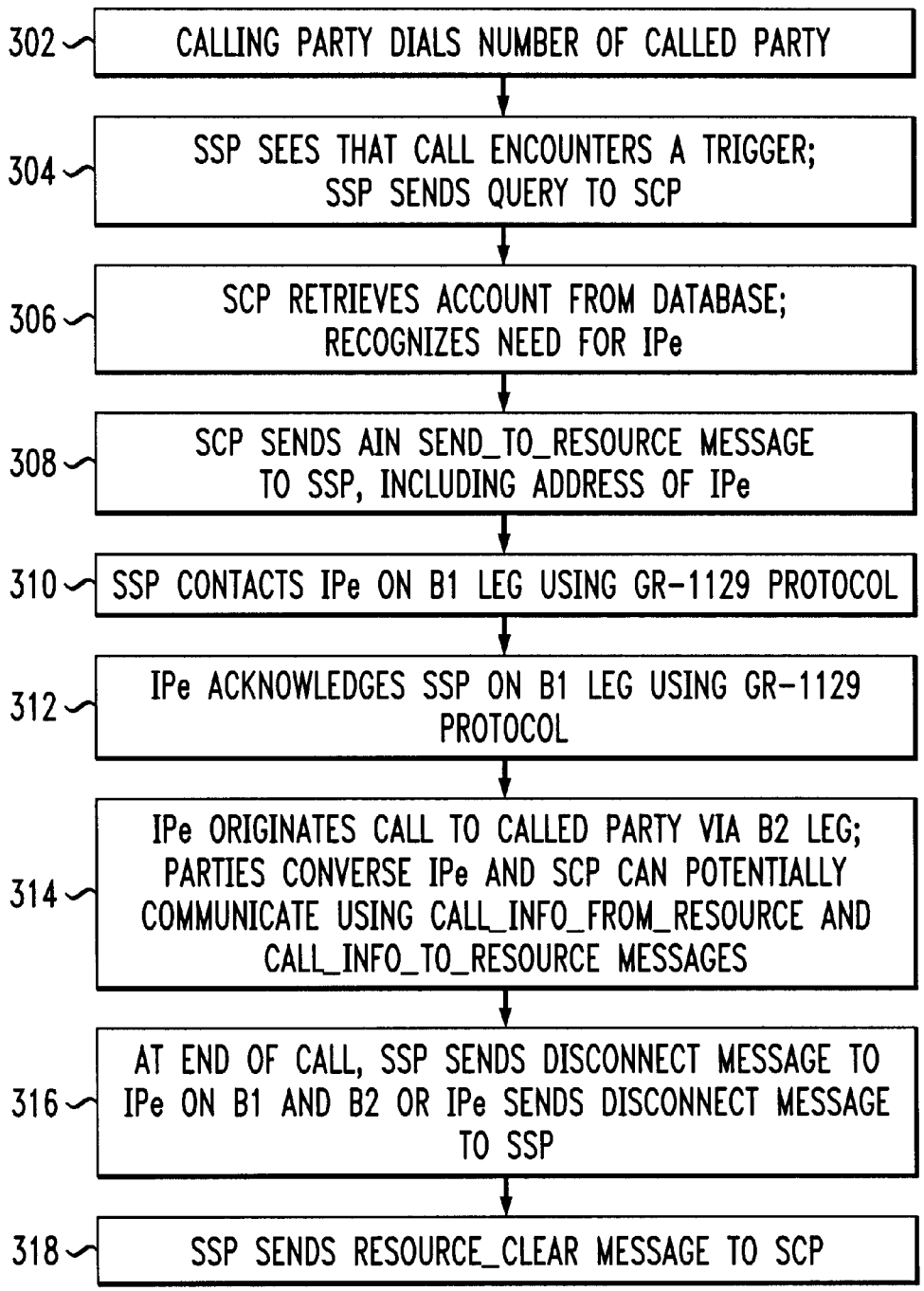
FIG. 2 shows a flow chart for the AIN of FIG. 1 in a call which uses the IPe.
Figure 3:
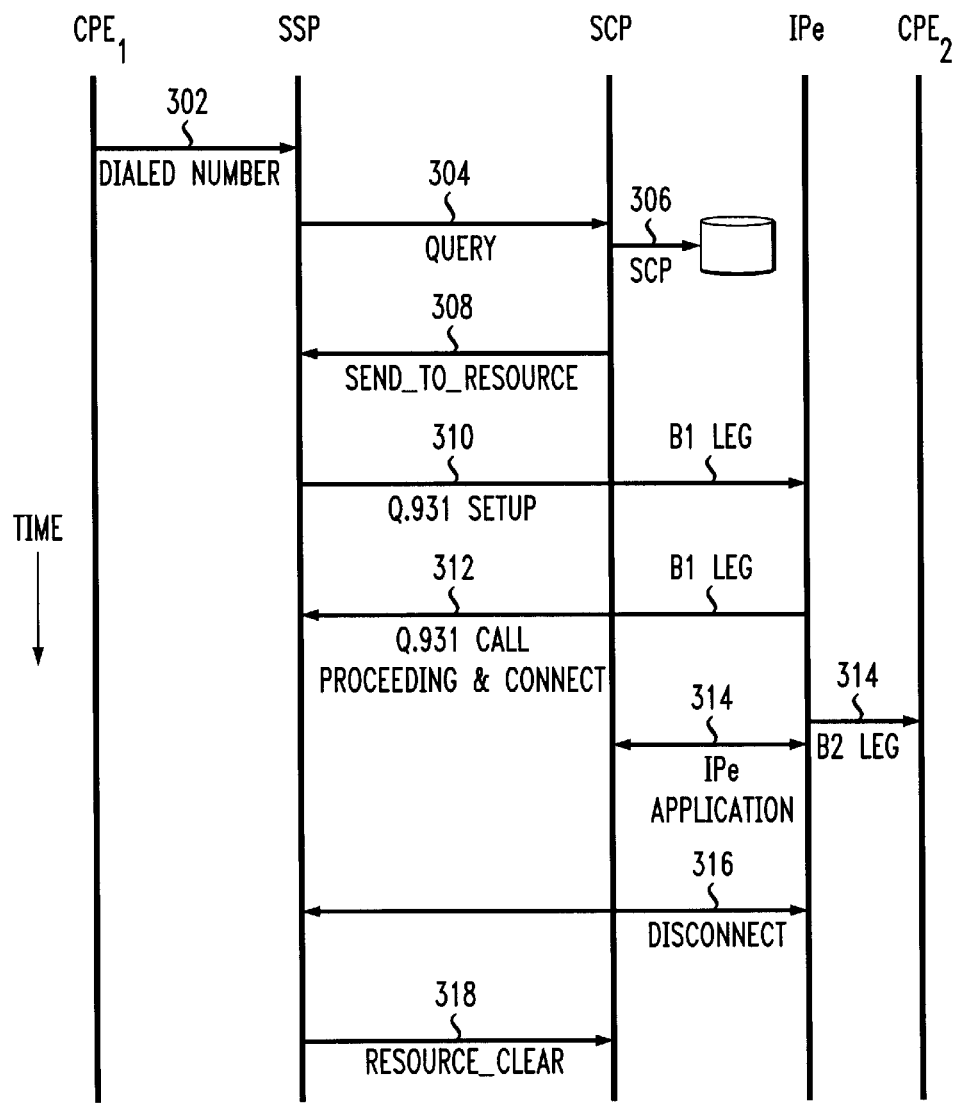
FIG. 3 shows a call flow diagram corresponding to the flow chart of FIG. 2.
Figure 4:
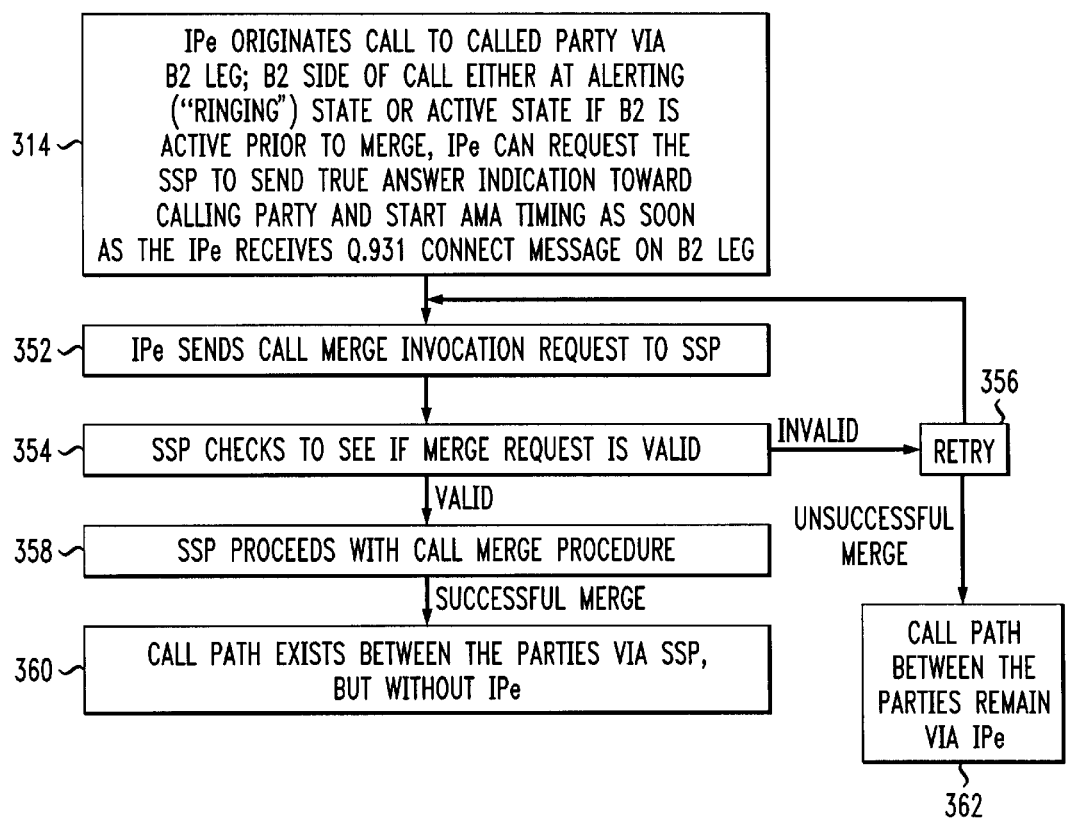
FIG. 4 shows a high-level flow chart in accordance with the present invention.

The present invention uses substantially the same components shown in FIG. 1. However, the software running on at least the SSP, the SCP and the IPe is modified in accordance with the present invention. FIG. 4 presents a high level flow chart 350 in accordance with the present invention. The logic flow of this flow chart 350 can be considered to begin with step 314 in FIG. 2. Thus in a preferred embodiment, the technique of the invention commences once the IPe originates a call on the B2 leg to the called party (after the B1 leg has already been established via the STR, which may contain the AMAS1p1D parameter when an AIN AMA record needs to be generated). It should be noted, however, that the B2 leg can be either in the Alerting ("ringing") state, or in the Active ("communicating" or "Connect") state.

Depending on the specific service, either the IPe or the SCP decides when the SSP should send an answer indication to the caller. For certain services, if the B2 leg reaches the active state prior to merge, the IPe could request the SSP to send the answer indication towards the calling party and start the AMA timing after the IPe receives the Q.931 Connect message on the B2 leg. One way to implement this is for the IPe to send a Q.931 Facility message to the SSP on the B1 leg with a new supplementary service invocation that the SSP can interpret appropriately. For other services, the SCP will decide when the IPe should request the SSP to send the answer indication. One scenario resulting in the SCP deciding when the IPe should make the request is as follows: (1) The IPe sends the Call_Info_From_Resource message to the SCP after an appropriate event, (2) the SCP logic determines that an answer indication should now be sent, and (3) the SCP responds to the IPe with a Call_Info_To_Resource message containing information to the IPe to request the SSP to send the answer indication.

In step 352, the IPe sends a request "call merge invocation request" to the SSP, asking that the SSP merge the calls on the B1 and the B2 legs. This request preferably comes after the IPe is done supporting the call (e.g., the IPe has already provided the services for which it was contacted in the first place) and need no longer participate. The call merge request is sent from the IPe to the SSP on one (B1 or B2) of the two legs and includes identifying information about exactly what calls are to be merged. In particular, the call merge invocation request identifies the other leg (B2 or B1), preferably with either the channel ID or the other leg's call reference value. In addition to this identifying information, the IPe also sends the AMA record related information to the SSP. The AMA record related information includes information reflecting the time that B1 and B2 are bridged together in the IPe; it also can contain timing adjustment information and service related information about the call(s) that the IPe is handling, including the calls to be merged. The SSP may process the AMA record related information to update AMA records by itself, or may send this information on to the SCP, as discussed further below.

It should be noted here that the IPe could remain on the call for a while—until it or the SCP decides that its resources are no longer needed. For the case where the SCP decides to merge the call, the SCP will tell the IPe that the IPe can start with the merge procedure. One way to implement this is for the SCP to send an AIN Call_Info_To_Resource (with new encoding which IPe will interpret and the go-ahead to start the merge procedure) in response to receiving an AIN Call_Info_From_Resource from the IPe. The decision as to which entity decides when the merge takes place, the IPe or the SCP, depends on the specific service. In step 354, the SSP checks to see if the merge request is valid. To accomplish this, the SSP checks to see whether the STR connection is Active on the B1 side and also checks to see whether the B2 side is in either the Alerting or Active states. Also, in addition to the marking of the IPe trunk, a separate subscription option may need to be set in the SSP to allow a call merge. In addition, there may be other limitations that the SSP must check to determine whether a merge request can be honored. For example, only a first predetermined number N of call merges may be allowed at the same time. In such case, the SSP must verify that the current merge request will not result in exceeding this predetermined number. Alternatively, or in addition, only a second predetermined number M of merges may be permitted within a time interval, and the SSP must make sure that limitation, too, is not exceeded.

If the SSP determines that the merge request is not valid, in step 356, the SSP notifies the IPe that the merge shall not take place, and the IPe is permitted to retry the merge request by directing control back to step 352.

If, on the other hand, the SSP determines that the merge request is valid, control flows to step 358 where the SSP proceeds with the call merge procedure, described below in further detail. Whether or not the call merge is successful, however, the call between the parties is unaffected by the outcome of the attempt at call merge.

If the call merge procedure is successful, then the parties are thereafter connected directly via the SSP without further involvement of the IPe, as depicted by step 360. If, on the other had, the call merge procedure is unsuccessful, the SSP notifies the IPe of this. The IPe, in turn, saves the AMA record related information internally and can periodically try to invoke the call merge. The parties, however, remain connected to each other via the IPe, as depicted by step 362.

Figure 5:
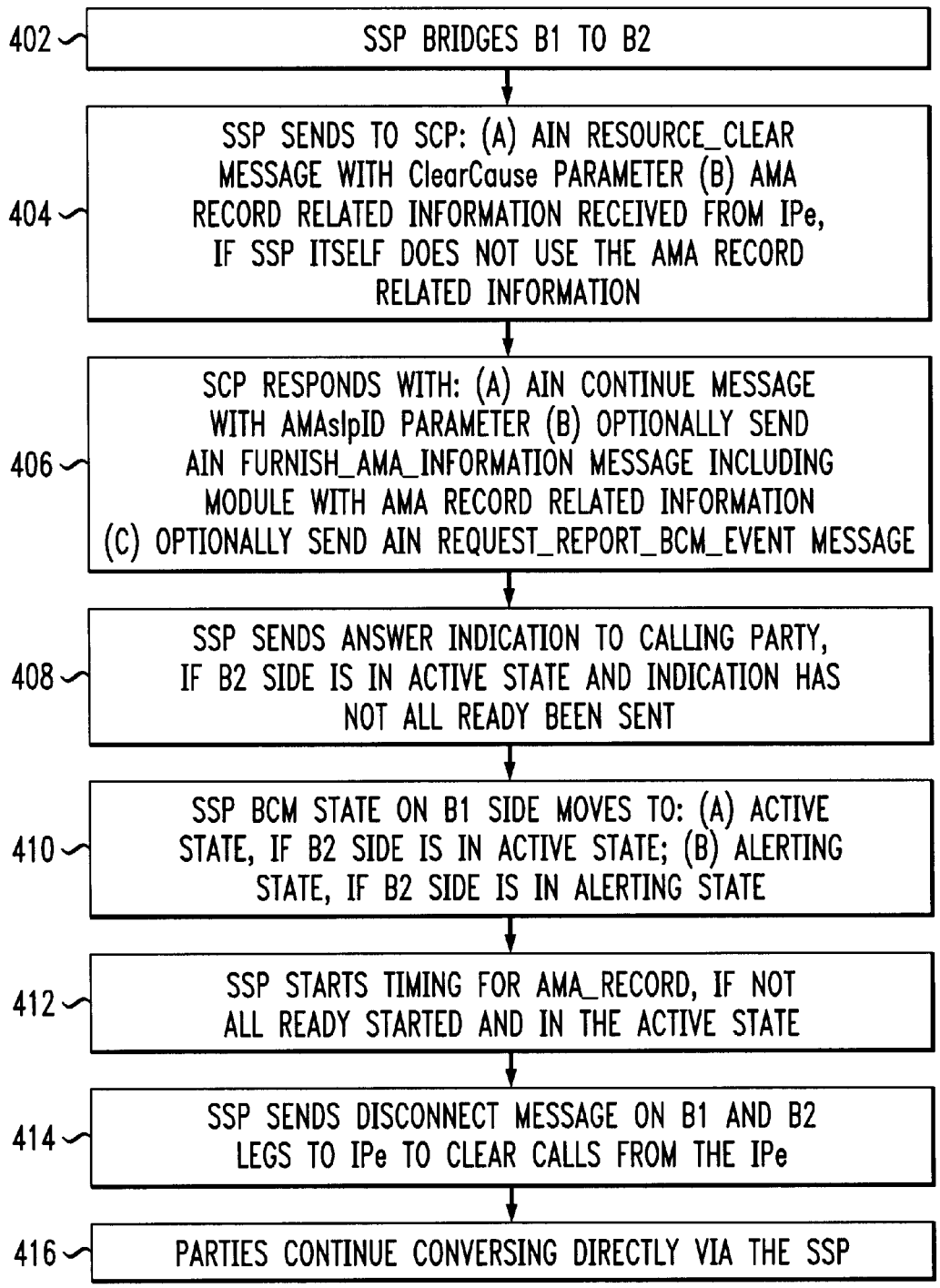
FIG. 5 shows a flow chart of a merge procedure in accordance with the present invention.

FIG. 5 presents a flow chart of a preferred embodiment of the merge procedure 358 of FIG. 4. In step 402, the SSP bridges B1 to B2. This connects the calling party to the called party. Once this is done, in step 404, the SSP sends an AIN Resource_Clear message in a conversation package with Clear_Cause Parameter (e.g., with a new value of "STR Supplementary service invoked") to the SCP. As is known to those familiar with AIN protocols, the Resource_Clear message is sent from the SSP to the SCP to let the SCP know that the STR connection with the IPe is over, and Clear_Cause is a mandatory parameter in the Resource_Clear message which tells the SCP the circumstances under which the STR connection with the IPe is closed. Also, in step 402, the SSP may send the AMA record related information received from the IPe, even if the AMA record related information is directly processed by the SSP to update the AMA record. Upon sending either, or both, of these types of information to the SCP, the SSP starts an internal timer to see if it receives a response from the SCP within a predetermined time period.

In step 406, the SCP responds with an AIN Continue message so that the SSP will continue with the rest of the SSP procedures. The SCP will optionally send the AIN Furnish_AMA_Information message, which contains information from the SCP to update the AMA record at the SSP, including module(s) which contain AMA record related information, assuming this information was received from the IPe via the SSP. Alternatively, as discussed above, this information may directly be processed by the SSP to update the AMA record, and in such case, the AMA record related information may not be sent to the SCP.

Also, in step 406, the SCP optionally sends an AIN Request_Report_BCM_Event ("Basic Call Model Event") message, which allows the SSP to monitor for specified events and, if such an event is received, causes the SSP to communicate with the SCP for further instructions. In this instance, the AIN Request_Report_BCM_Event message causes the SSP to arm certain event detection points such as the O_Mid_Call trigger (e.g., switch hook flash triggers), among others. The AIN Continue, AIN Furnish_AMA_Information and AIN Request_Report_BCM_Event messages, if present, are sent in the same package.

If, in step 406, the SCP response is not received due to, say, abnormal conditions, the SSP will not allow the merge and the call will continue to be connected through the IPe.

In step 408, the SSP will send an Answer indication to the calling party, if the Answer indication has not previously been sent, and if the B2 side is in the Active state.

As is known to those skilled in the art, in an AIN system, the SSP maintains certain call states, including BCM (Basic Call Model) states. For each leg of the call, the SSP maintains an Originating_BCM (O_BCM) state and a Terminating_BCM (T_BCM) state, which track the states of the legs. In step 410, the SSP BCM state on the B1 side will move to an Active state, if the B2 side is in the Active state. If, instead, the B2 side is in the Alerting state, then the SSP BCM state will also move to the Alerting state.

In step 412, the SSP starts timing for AMA Record if is has not already started, and if it is in the Active state. The timing results are later used to create the billing record which, in turn, ultimately is used to properly bill the customer.

Figure 6A:
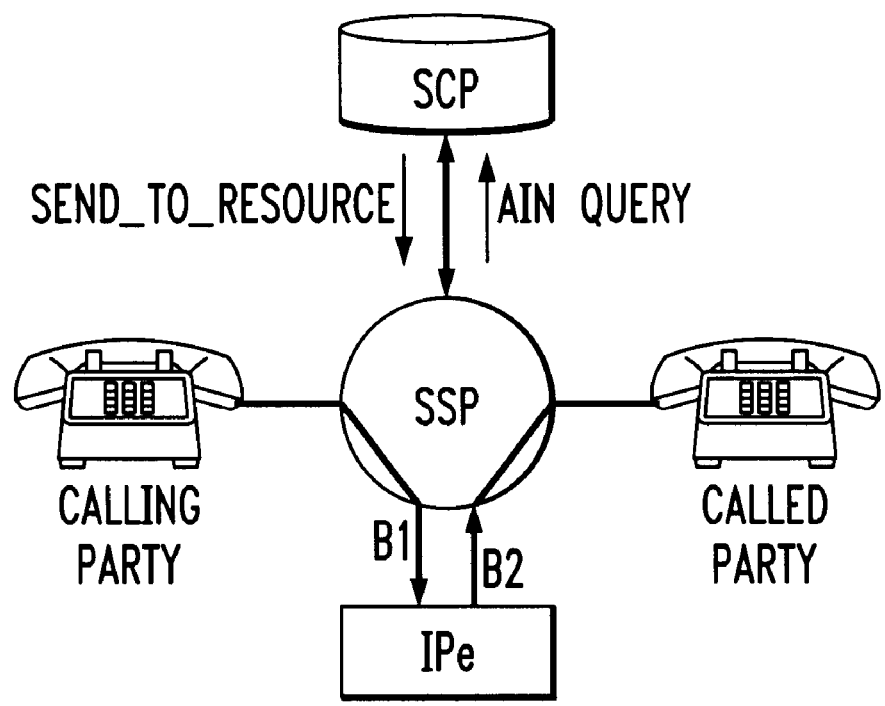
FIGS. 6A & 6B sketch the call connections prior to a merge, and after a merge in accordance with the present invention.
Figure 6B:
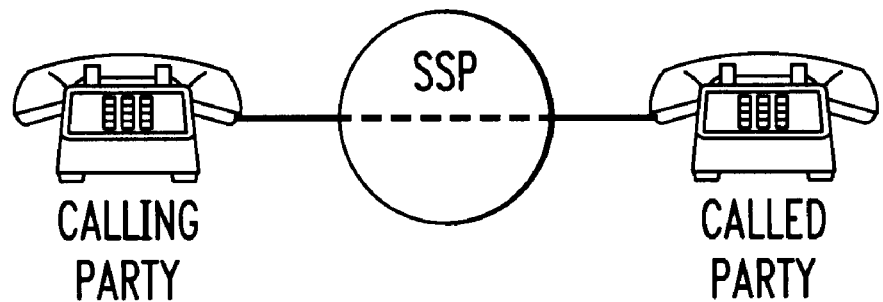

In step 414 the SSP sends Disconnect messages on the B1 and B2 legs to the IPe to clear calls from the IPe, thereby making the corresponding IPe ports available once more. Once the IPe has been released, the parties converse directly via the SSP, as depicted in FIG. 6B, and without having the signal relayed through the IPe, as depicted in FIG. 6A. It is noted that in FIGS. 6A & 6B, there may be multiple switches involved: one switch hosting the calling party (originating switch), a second switch hosting the IPe and a third switch hosting the called party (terminating switch). In such case, interaction with the SCP prior to the merge typically is with the originating switch (e.g., the SSP), where the AMA record would also most likely be created. It is possible, however, that another AMA record may be created at the SSP hosting the IPe with respect to the B2 leg.

In general, parties may drop and parties may be added on the same call, as per the specific service needs, before call merge takes place. However, if one of the parties drops off before execution of a call merge request and the IPe is no longer needed for the service on that call, the IPe ports are released for use by other requests. This takes place within the framework of messages exchanged between the SCP, IPe and the SSP. It should be noted, however, that in the event that the called party drops the call and the IPe port to the B1 side is released, the SCP could still keep the calling party on the call so that it may do other things. In a preferred embodiment, the following steps are invoked at a high level to release the IPe, pursuant to either party dropping the call:

(1) The IPe and the SSP complete the disconnect procedure on the B2 leg, using standard ISDN procedures, if either the B2 or the B1 side party drops off. It should be kept in mind, however, that if the B1 side drops off, the IPe is going to receive the CancelIPResource operation in a Facility message from the SSP.

(2) The IPe then sends a Disconnect message on the B1 side of the leg to the SSP as per the GR-1129 procedure. The Disconnect message may include, or be accompanied by, the AMA record related information.

(3) The IPe and the SSP complete the disconnect procedure on the B1 leg.

(4) The SSP sends an AIN Resource_Clear message to the SCP. If AMA record related information is received from the IPe, then the SSP may directly update the AMA record related information; alternatively, the SSP may send it to the SCP along with the Resource_Clear message. The Resource_Clear message will be in a TCAP Response package if the calling party drops and the AMA record related information is used by the switch directly; otherwise, the TCAP Conversation package is used.

(5) If Resource_Clear message was sent in a TCAP Conversation package, then the SCP sends a message to the SSP which may include the AMA record related information that causes the SSP to generate an appropriate record.

It should be noted, however, that the above steps may have variations and need not be taken in precisely the order given. For example, the order in which B2 and B1 are disconnected may be reversed, without adversely impacting operation of the AIN.

To implement the foregoing invention, one skilled in the art will readily recognize that modifications must be made to the current operation of the SSP, the SCP and the IPe. These modifications preferably do not involve any hardware upgrades, but rather entail software modifications, implemented by either reprogramming, or otherwise reconfiguring these devices to behave in the desired manner.

Finally, while the above invention has been described with reference to certain preferred embodiments, it should be kept in mind that the scope of the present invention is not limited to these. One skilled in the art may find variations of these preferred embodiments which, nevertheless, fall within the spirit of the present invention, whose scope is defined by the claims set forth below.

What is claimed is:

1. A method for handling a telephone call from a calling party to a called party in an AIN system having at least one service switching point (SSP), at least one service control point (SCP) and at least one intelligent peripheral (IPe), the method comprising the steps of:

sending, from the SCP to the SSP, a request message to establish a temporary bearer connection between the SSP and the IPe under the control of the SCP;

establishing a first connection carrying a first call from the SSP to the IPe, in response to the request message;

establishing a second connection carrying a second call from the IPe to a called party;

bridging the first and second calls in the IPe between the calling party and the called party;

merging the first and second calls in the SSP; and disconnecting the first and second connections to the IPe, such that the calling party and the called party are continued to be connected via the SSP with the call no longer being relayed through the IPe.

2. The method of claim 1, further comprising the step of:

sending, from the IPe to the SSP, a request to merge the first and second calls.

3. The method of claim 2, further comprising the step of:

determining, at the SSP, whether the request to merge is valid, before allowing the first and second calls to be merged.

4. The method of claim 3, further comprising the step of:

bridging the first and second calls at the SSP;

sending, from the SSP to the SCP, a message indicating that the first connection and the IPe whose calls are being merged, are once again available;

sending, from the SCP to the SSP, a message to continue call processing; and disconnecting the first and second connections between the SSP and the IPe.

5. The method of claim 1, further comprising the step of:

sending a message from the SCP to the IPe, to merge the first and second calls.

6. The method of claim 1, wherein, if, prior to merging the first and second calls, the second connection reaches an active state indicating that the call has been answered, requesting, by the IPe, that the SSP inform the calling party that the call has been answered.

7. The method of claim 6, further comprising the step of:

starting, by the IPe, automated record management timing after the IPe receives an answer indication via the second connection.

8. The method of claim 6, further comprising a step of:

sending, by the SCP to the IPe, a message which causes the IPe to request that the SSP send the answer indication.

9. The method of claim 1, further comprising the step of:

sending, from the IPe to the SSP, account record-related information, either during or prior to the step of merging the first and second calls in the SSP.

10. The method of claim 9, further comprising the step of:

processing the account record-related information to update account records, by the SSP, either during or prior to the step of merging the first and second calls in the SSP.

11. The method of claim 10, further comprising the step of:

sending, from the SSP to the SCP, the account record-related information received from the IPe, either during or prior to the step of merging the first and second calls in the SSP.

12. The method of claim 9, further comprising the steps of:

sending, from the SSP to the SCP, the account record-related information received from the IPe, and sending, from the SCP to the SSP, a message furnishing account record-related information, prior to the step of merging the first and second calls in the SSP.

13. The method of claim 1, further comprising the steps of:

sending, from the SSP to the SCP, a message indicating that certain resources are once again available; and sending, from the SCP to the SSP, a message to continue call processing, prior to the step of merging the first and second calls in the SSP.

14. The method of claim 1, wherein the request message is an AIN Send to Resource message.

15. In a method for handling a telephone call in an AIN system comprising at least one service switching point (SSP), at least one service control point (SCP) and at least one intelligent peripheral (IPe) in which, in response to a first call from a calling party, the SCP sends a request message to the SSP to establish a temporary bearer connection between the SSP and the IPe under the control of the SCP, and whereby the SSP establishes a first connection carrying the first call to the IPe, and the IPe establishes a second connection carrying a second call to the called party, the first and second calls being connected in the IPe to complete the call between the calling party and the called party, the improvement comprising the steps of:

merging the first and second calls in the SSP; and disconnecting the first and second connections to the IPe, such that the calling party and the called party are continued to be connected via the SSP with the call no longer being relayed through the IPe.

16. The method of claim 15 wherein the request message is an AIN Send_to_Resource message.

17. In an AIN system comprising at least one service switching point (SSP), at least one service control point (SCP) and at least one intelligent peripheral (IPe), wherein:

the SCP is configured to send a request message to the SSP to establish a temporary bearer connection between the SSP and the IPe under the control of the SCP, in response to a query from the SSP;

the SSP is configured to establish a first connection carrying a first call to the IPe in response to the request message;

the IPe is configured to establish a second connection carrying a second call to a called party, with the first and second calls being connected in the IPe to complete the call between the calling party and the called party;

the improvement comprising:

configuring the IPe and SSP to merge the first and second calls within the SSP and disconnect the first and second connections to the IPe, following invocation by the IPe pursuant to an STR message, to thereby free IPe resources for the remainder of the merged call.

18. The system of claim 17, wherein the request message is an AIN Send_to_Resource message.

19. A method for handing a telephone call from a calling party to a called party in an AIN system having at least one service switching point (SSP), at least one service control point (SCP) and at least one intelligent peripheral (IPe), the method comprising the steps of:

sending, from the SCP to the SSP, a request message to establish a temporary bearer connection between the SSP and the IPe under the control of the SCP;

establishing a first connection carrying a first call from the SSP to the IPe, in response to the request message;

establishing a second connection carrying a second call from the IPe to a called party;

bridging the first and second calls in the IPe between the calling party and the called party;

determining that the IPe is no longer needed because one of the calling party and the called party has dropped its call;

sending, from the IPe to the SSP, account record related-information a disconnect message, on the first connection.

20. The method of claim 19 further comprising the step of:

processing, by the SSP, the account record-related information to update account records.

21. The method of claim 19, further comprising the step of:

sending, from the SSP to the SCP, the account record-related information received from the IPe.

22. The method of claim 19, further comprising the steps of:

sending, from the SSP to the SCP, the account record-related information received from the IPe, and sending, from the SCP to the SSP, a message furnishing account record-related information.

23. The method of claim 19, wherein the request message is an AIN Send_to_Resource message.

* * * * *